(12) United States Patent
Shrestha

(10) Patent No.: US 8,867,592 B2
(45) Date of Patent: Oct. 21, 2014

(54) CAPACITIVE ISOLATED VOLTAGE DOMAINS

(75) Inventor: Rameswor Shrestha, Eindhoven (NL)

(73) Assignee: NXP B.V., Eindhoven (NL)

( * ) Notice: Subject to any disclaimer, the term of this patent is extended or adjusted under 35 U.S.C. 154(b) by 118 days.

(21) Appl. No.: 13/467,854

(22) Filed: May 9, 2012

(65) Prior Publication Data

US 2013/0301690 A1    Nov. 14, 2013

(51) Int. Cl.
H04L 5/16 (2006.01)

(52) U.S. Cl.
USPC ............. 375/219; 375/340; 307/77; 307/104; 307/31; 345/73; 345/174

(58) Field of Classification Search
USPC .................................................. 375/340, 219
See application file for complete search history.

(56) References Cited

U.S. PATENT DOCUMENTS

| | | |
|---|---|---|
| 3,273,033 A | 9/1966 | Rossmeisl |
| 4,292,595 A | 9/1981 | Smith |
| 4,723,307 A | 2/1988 | Clark et al. |
| 4,748,419 A | 5/1988 | Somerville |
| 4,896,287 A | 1/1990 | O'Donnell et al. |
| 5,138,436 A | 8/1992 | Koepf |
| 5,187,636 A | 2/1993 | Nakao |
| 5,187,637 A | 2/1993 | Embree |
| 5,321,597 A | 6/1994 | Alacoque |
| 5,341,040 A | 8/1994 | Garverick et al. |
| 5,488,588 A | 1/1996 | Engeler et al. |
| 6,014,047 A | 1/2000 | Dreps et al. |
| 6,271,131 B1 | 8/2001 | Uhlenbrock |
| 6,329,834 B1 | 12/2001 | Krasnansky |
| 6,331,999 B1 | 12/2001 | Ducaroir |
| 6,347,395 B1 | 2/2002 | Payne et al. |
| 6,429,735 B1 | 8/2002 | Kuo |
| 6,507,226 B2 | 1/2003 | Swonger |
| 6,636,166 B2 | 10/2003 | Sessions et al. |
| 6,664,859 B1 | 12/2003 | Chen |
| 6,809,569 B2 | 10/2004 | Wang |
| 6,839,862 B2 | 1/2005 | Evoy et al. |
| 6,859,883 B2 | 2/2005 | Svestka et al. |
| 6,882,046 B2 | 4/2005 | Davenport et al. |

(Continued)

FOREIGN PATENT DOCUMENTS

| | | |
|---|---|---|
| EP | 1291918 | 12/2003 |
| EP | 1564884 | 8/2005 |
| GB | 2204467 A | 11/1988 |

OTHER PUBLICATIONS

Abedinpour S., Bakkoglu B., with Integrated Output Filter in 0.18 m SiGe Process, IEEE Kiaei S., A Multistage Interleaved Synchronous Buck Converter Transactions on Power Electronics, vol. 22, No. 6, Nov. 2007.

(Continued)

*Primary Examiner* — Eva Puente

(57) ABSTRACT

In some embodiments, a receiver circuit is configured to receive a modulated signal from a transmitter that is galvanically isolated from the receiver circuit. The receiver circuit is configured to demodulate the modulated signal by using two comparator circuits that respectively detect the presence or absence of first and second signal states of a carrier signal. Based on the detection of the first and second states, the receiver circuit determines whether the carrier signal is present or absent in the modulated signal to determine a demodulated value of the modulated signal.

21 Claims, 5 Drawing Sheets

(56) References Cited

U.S. PATENT DOCUMENTS

| | | |
|---|---|---|
| 6,920,576 B2 | 7/2005 | Ehmann |
| 6,992,377 B2 | 1/2006 | Zhou |
| 7,199,617 B1 | 4/2007 | Schrom |
| 7,302,247 B2 | 11/2007 | Dupuis |
| 7,327,783 B2 | 2/2008 | Sullivan |
| 7,376,212 B2 | 5/2008 | Dupuis |
| 7,400,173 B1 | 7/2008 | Kwang et al. |
| 7,411,421 B1 | 8/2008 | Steinke |
| 7,421,028 B2 | 9/2008 | Dupuis |
| 7,447,492 B2 | 11/2008 | Dupuis |
| 7,460,604 B2 | 12/2008 | Dupuis |
| 7,577,223 B2 | 8/2009 | Alfano et al. |
| 7,650,130 B2 | 1/2010 | Dupuis |
| 7,724,815 B1 | 5/2010 | Raha et al. |
| 7,732,889 B2 | 6/2010 | Crawley et al. |
| 7,737,871 B2 | 6/2010 | Leung et al. |
| 7,738,568 B2 | 6/2010 | Alfano et al. |
| 7,751,519 B2 | 7/2010 | Farbarik et al. |
| 7,755,400 B2 | 7/2010 | Jordanger et al. |
| 7,821,428 B2 | 10/2010 | Leung et al. |
| 7,856,219 B2 | 12/2010 | Dupuis |
| 7,902,627 B2 | 3/2011 | Dong et al. |
| 8,049,573 B2 | 11/2011 | Alfano et al. |
| 8,064,872 B2 | 11/2011 | Dupuis |
| 8,188,814 B2 | 5/2012 | Ng et al. |
| 8,198,951 B2 | 6/2012 | Dong et al. |
| 8,284,823 B2 | 10/2012 | Breitfuss |
| 8,442,099 B1 | 5/2013 | Sederat |
| 2001/0052623 A1 | 12/2001 | Kameyama et al. |
| 2002/0021144 A1 | 2/2002 | Morgan et al. |
| 2002/0184544 A1 | 12/2002 | Svestka et al. |
| 2002/0186058 A1 | 12/2002 | Prodanov |
| 2003/0021390 A1 | 1/2003 | Delbecq et al. |
| 2003/0214346 A1 | 11/2003 | Pelliconi |
| 2004/0076192 A1 | 4/2004 | Zerbe |
| 2004/0159893 A1 | 8/2004 | Kitahara |
| 2004/0161068 A1 | 8/2004 | Zerbe |
| 2004/0174147 A1 | 9/2004 | Vinciarelli |
| 2005/0026581 A1* | 2/2005 | Wood ............................ 455/219 |
| 2005/0127452 A1 | 6/2005 | Rippke |
| 2005/0174156 A1 | 8/2005 | Wu |
| 2006/0138595 A1 | 6/2006 | Kiyotoshi |
| 2006/0224649 A1 | 10/2006 | Chiskis |
| 2007/0069768 A1* | 3/2007 | Hatooka et al. ................ 327/74 |
| 2007/0075784 A1 | 4/2007 | Pettersson et al. |
| 2007/0253468 A1* | 11/2007 | Pettersen et al. ............. 375/146 |
| 2008/0174360 A1 | 7/2008 | Hsu |
| 2008/0218258 A1* | 9/2008 | Crawley et al. ................ 330/10 |
| 2008/0290444 A1 | 11/2008 | Crawley |
| 2009/0017773 A1 | 1/2009 | Dupuis et al. |
| 2009/0146760 A1 | 6/2009 | Reefman |
| 2009/0213914 A1 | 8/2009 | Dong et al. |
| 2009/0237858 A1 | 9/2009 | Steeneken |
| 2010/0052826 A1 | 3/2010 | Callahan et al. |
| 2010/0093388 A1* | 4/2010 | Bagchi .......................... 455/522 |
| 2010/0118918 A1 | 5/2010 | Dupuis |
| 2010/0214716 A1 | 8/2010 | Liu et al. |
| 2010/0327940 A1 | 12/2010 | Eisenstadt |
| 2011/0006814 A1 | 1/2011 | Acar |
| 2011/0148549 A1 | 6/2011 | Kanschat et al. |
| 2011/0292977 A1 | 12/2011 | Farjadrad |
| 2013/0001738 A1 | 1/2013 | Dong |
| 2013/0024059 A1 | 1/2013 | Miller et al. |
| 2013/0037909 A1 | 2/2013 | French et al. |
| 2013/0128396 A1 | 5/2013 | Danesh et al. |
| 2013/0154071 A1 | 6/2013 | Haigh et al. |

OTHER PUBLICATIONS

Aoki I., Kee S., Magoon R., Aparicio R., Bohn F., Zachan J., Hatcher G., McClymont D., Hajimiri A., " A Fully Integrated Quad-Band GSM/GPRS CMOS Power Amplifier", International Solid-State Circuits Conference, 2007.

Kursun V., Narendra S.G., De V.K., Friedman E.G., "High input voltage step-down DC-DC converters for integration in a low voltage CMOS process", Quality Electronic Design, 2004.

Rocha J., Santos M., Dores Costa J.M., Lima F., "High Voltage Tolerant Level Shifters and DCVSL in Standard Low Voltage CMOS Technologies", IEEE, 2007.

Sonsky J., Heringa A., Perez-Gonzalez J., Benson J., Chiang P.Y., Bardy S., Volokhine I."Innovative High Voltage transistors for complex HV/RF SoCs in baseline CMOS", IEEE, 2008.

S. M. Sze, "Semiconductor Devices Physics and Technology", 2nd Edition, John Wiley and Sons, Inc., pp. 493-494 and 503-507, 1985, 2002.

Burr Brown, ISO 103, Low Cost, Internally Powered Isolation Amplifier, IC Publication Datasheet, Burr Brown Corporation, 1989.

Stephen Mick, et al., "Packaging Technology for AC Coupled Interconnection", IEEE Flip-Chip Conference, 2002.

Greg Smith, "Hybrid Isolation Amps Zap Price and Voltage Barriers" Electronic Design, Dec. 11, 1986, pp. 91-?.

Wally Meinel, et al., "Hermetic Analog Isolation Amplifier", Proceedings of the 1987 International Symposium on Microelectronics, Minneapolis, Sep. 1987.

Burr Brown, Noise Sources in Applications Using Capacitive Coupled Isolated Amplifiers, Application Bulletin, Burr Brown Corporation, 1993.

Burr Brown, Hybrid Isolation Amps Zap Price and Voltage Barriers, Application Bulletin, Burr Brown Corporation, 1994.

Burr Brown, An error analysis of the ISO102 in a small signal measuring application, Application Bulletin, Burr Brown Corporation, 1994.

Burr Brown, ISO 102, ISO 106 Signal Isolation Buffer Amplifiers, Datasheet, Burr Brown Corporation, 1995.

J. Basilio Simoes, et al., "The Optical Coupling of Analog Signals" IEEE Transaction on Nuclear Science, vol. 43, No. 3, Jun. 1996, pp. 1672-1674.

Stephen L. Diamond, "IEEE 1394: Status and growth path", IEEE Micro, Jun. 1996, pp. 75-78.

Thaddeus J. Gabara, et al., "Capacitive coupling and quantized feedback applied to conventional CMOS technology" IEEE Journal of Solid-State Circuits, vol. 32, No. 3, Mar. 1997.

Adrian Paskins, "The IEEE 1394 BUS", The Institution of Electrical Engineers Conference, May 12, 1997.

Richard Crisp, "Direct Rambus Technology: The New Main Memory Standard" IEEE Micro, Nov./Dec. 1997, pp. 18-28.

Thomas Nilsson, "A distributed combined heat and power plant control unit", Master Thesis, Linköping Institute of Technology, Dec. 16, 1997.

Scott Wayne, "Finding the Needle in a Haystack: Measuring Small differential voltages in the presence of large-common mode voltages", Analog Dialogue, 34-1, 2000, pp. 1-4.

Infineon Technologies, IVAX Integrated Voice & ADSL Transceiver, PEB35512, PEB55508, PEB3558, PEB4565, PEB4566, Datasheet, Infineon Technologies AG, 2001.

William B. Kuhn, et al., "An RF-based IEEE 1394 Ground Isolator designed in silicon-on-insulator process" Circuits and Systems, 2001. MWSCAS 2001. Proceedings of the 44th IEEE 2001 Midwest Symposium on ,vol. 2 , Aug. 14-17, 2001.

Scott Irwin, XILINX, "Usage Models for multi-gigabit serial transceivers", WP157, V.1.0, Mar. 15, 2002.

phyCORE-MCF548x Hardware Manual, PHYTEC Technology Holding Company, Jan. 2005.

LANTRONIX, Xpress-DR+Wireless, Datasheet, LANTRONIX, 2006.

Eugenio Culurciello, et al., "Capacitive inter-chip data and power transfer for 3-D VLSI" IEEE Trans. Circuits Syst. II, vol. 53, No. 12, pp. 1348-1352, 2006.

Geoffrey Marcus, et al., "A Monolithic Isolation Amplifier in silicon-on-isolator CMOS: Testing and Applications", Analog Integr. Circ. Sig. Process, Jun. 27, 2006.

Inoue, A et al "A high efficiency, high voltage, balanced cascode FET", IEEE International Microwave Symposium, Jun. 1995.

* cited by examiner

CAPACITIVE ISOLATED VOLTAGE DOMAINS

Aspects of the present disclosure relate to apparatuses, devices, and methods involving communication interfaces useful for galvanic isolation in circuits. Galvanic isolation has been used for a variety of different applications. Galvanic isolation can be provided between multiple integrated circuit chips, which can be located within the same package or in different packages.

For example, circuits may be galvanically isolated using capacitive coupling on signal paths between the circuits. As a result of such isolation, the circuits operate in separate voltage domains that are not referenced to one another by a common ground voltage level. For instance, applications such as electric vehicles, and motor drivers employ high voltage and low voltage domains, in which the low voltage domain may be used for controlling aspects of the high voltage domain. In such applications, the respective domains are desirably isolated from each other. As such, large voltage differences may arise between the corresponding voltage domains, which can result in damage to the circuits due to current surges and high voltage transients.

One type of galvanic isolation technique involves the use of differential signaling and capacitive coupling. These and other galvanic isolation techniques have various undesirable tradeoffs in properties such as, but not necessarily limited to, signal propagation delays, power consumption, pulse width distortion and carrier frequency requirements. Differential signaling solutions use two separate wires upon which corresponding signals are then transmitted differentially. The differentially transmitted signals can be modulated in a number of different manners in order to convey data. A few non-limiting examples include frequency modulation, amplitude modulation, and on-off key (OOK) modulation.

For digital data communication, OOK modulation is attractive because of simplicity of detection circuits. In some implementations of this approach, a modulated signal received by a galvanically isolated receiver is then amplified and squared. After squaring, an RF (radio frequency) component of the modulated signal is filtered out to retrieve the data signal. However, these approaches may not adequately preserve edge of the data signal. As a result, it can be difficult to achieve low pulse width distortion.

Aspects of the present disclosure relate generally to methods, circuits, and devices for the communication of data between galvanically isolated circuits. In some embodiments, a receiver circuit is configured to receive a modulated signal from a transmitter that is galvanically isolated from the receiver circuit. The receiver circuit is configured to provide common mode suppression for current transients, and demodulate the modulated signal using two comparator circuits. The first comparator circuit is configured to detect the absence of a first signal state of the modulated signal. The second comparator is configured to detect the absence of a second signal state of the modulated signal. For instance, for an application utilizing OOK modulation of a differential signal, the first comparator circuit may be configured to detect a first state of a differential transmitted carrier signal and the second comparator circuit may be configured to detect a second state of the differential transmitted carrier signal. The receiver circuit is configured to determine the absence of a carrier signal based on whether the first and second comparator circuits detect the absence of both the first signal state and the second signal state.

In some embodiments, the receiver circuit may include a logical OR gate having inputs connected to outputs of the first and second comparators to determine whether the carrier signal is present. In some embodiments, the receiver circuit includes a low-pass filter to filter high frequency noise in a demodulated signal output from the logical OR circuit that may be caused by process variations of transistors used to implement the comparators and/or the logical OR gate.

In some embodiments, the receiver is included in an apparatus having a transmitter operating in a different voltage domain than the receiver. The transmitter is galvanically isolated from the receiver by an isolation circuit that provides a capacitive-coupled signal path between the transmitter and receiver circuits. For instance, the transmitter is configured to modulate a data signal and transmit the modulated data signal, via the capacitive-coupled signal path, to the receiver circuit.

The above summary is not intended to describe each embodiment or every implementation of the present disclosure. The figures, detailed description, and claims that follow more particularly exemplify various embodiments.

Aspects of the present disclosure may be more completely understood in consideration of the detailed description of various embodiments of the present disclosure that follows in connection with the accompanying drawings, in which.

Figure 1:
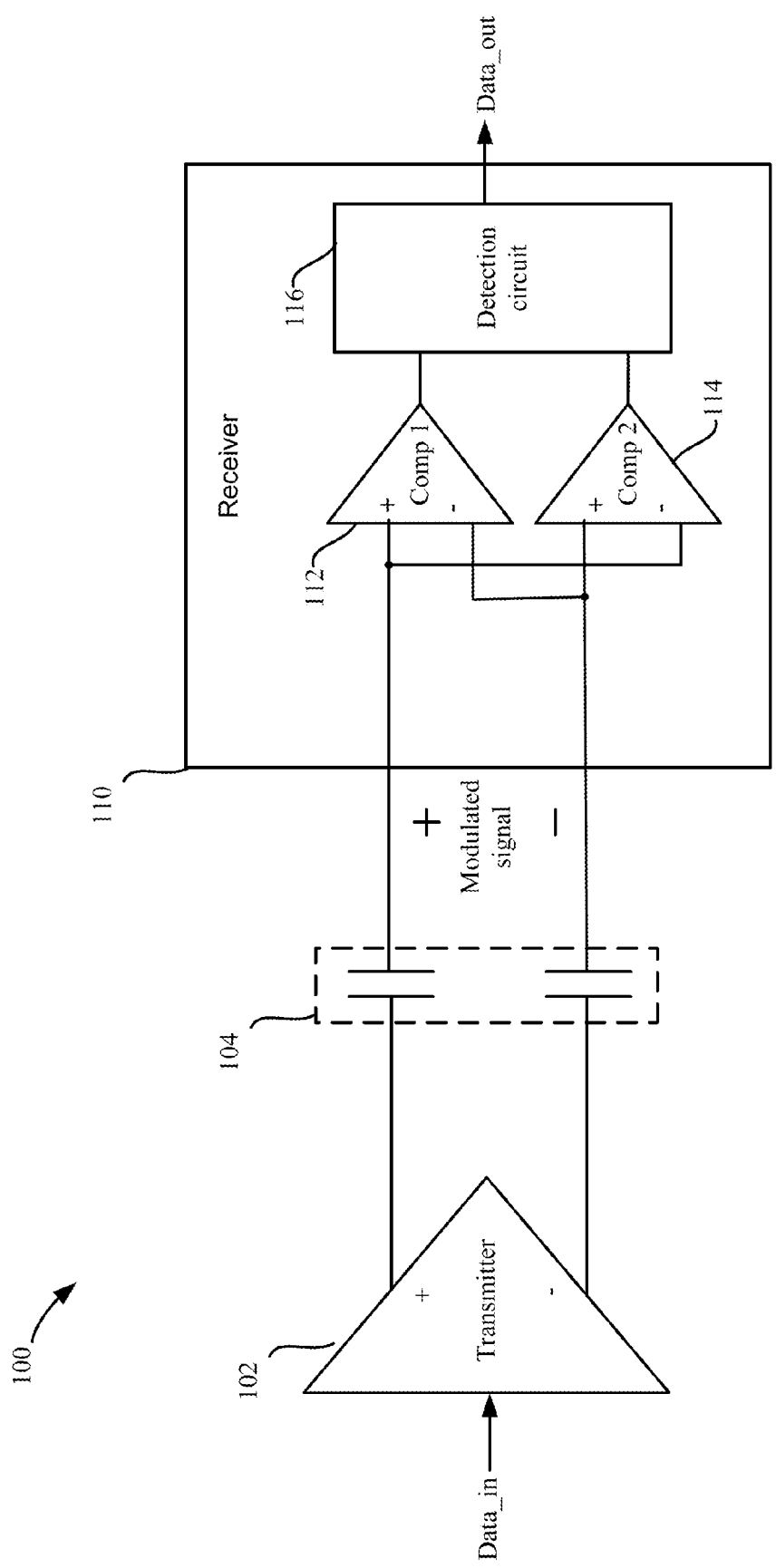
FIG. 1 depicts a block diagram of a system for communicating between two voltage domains, consistent with one or more embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. While the present disclosure is not necessarily limited in this context, various aspects of the disclosure may be appreciated through a discussion of related examples.

Aspects of the present disclosure relate to the transmission of data between circuits that are isolated from one another. For example, circuits may be galvanically isolated using capacitive coupling on signal paths between the circuits. As a result of such isolation, the circuits operate in separate voltage domains that are not referenced to one another by a common ground voltage level. As such, voltage differences may arise between the corresponding voltage domains. For certain applications, such as in automotive environments, the voltage differences have the potential to be large (e.g., hundreds of volts in electrically-powered vehicles).

Embodiments of the present disclosure are believed to be applicable to communication methods, devices, and systems involving data communication protocols between galvanically isolated circuits. Without intending to limit the embodiments to any particular communication protocol, for ease of explanation, the embodiments and examples are primarily discussed with reference to communication of signals using OOK modulation. In OOK modulation, the transmitter modulates a carrier signal from an oscillator according to an incoming data signal to generate an OOK modulated signal. The OOK modulated signal is communicated across a differential pair of capacitive-coupled signal lines to transmit the modulated signal between circuits operating in different voltage domains. It is understood that the embodiments may be applicable to other modulation techniques as well.

In some embodiments, a receiver circuit is configured to receive a modulated signal from a transmitter that is galvanically isolated from the receiver circuit. The receiver circuit is configured to demodulate the modulated signal by using two comparator circuits. For instance, in one particular embodiment, the receiver is configured to receive and demodulate an OOK modulated signal that is transmitted to the receiver via a differential pair of capacitive-coupled signal lines. The receiver demodulates the OOK modulated signal by detecting the presence or absence of a carrier signal to produce a demodulated signal having respective first or second data values. The carrier signal of the modulated signal (when present) has first and second states. For instance, the carrier signal may have a first state corresponding to a first value of a binary carrier signal and a second state the corresponding to a second value of the binary carrier signal. The first and second states may detected in a differential transmitted modulated signal, e.g., by comparing voltages of differential inputs to determine if the inputs have a positive or negative voltage difference that exceed a difference threshold. A first comparator circuit of the receiver is configured to detect the presence or absence of the first state of the carrier signal. A second comparator circuit of the receiver is configured to detect the presence or absence of the second state of the carrier signal. For instance, in a particular implementation, the first comparator is configured to indicate that the first state is present when the differential inputs exhibit a positive voltage difference that exceeds a difference threshold. Similarly, the second comparator is configured to indicate that the second state is present when the differential inputs exhibit a negative voltage difference that exceeds the difference threshold. Based on the detection of the first and second states, the receiver circuit determines whether the carrier signal is present or absent to determine a demodulated value of the modulated signal.

In some other approaches, presence or absence of a carrier signal in a received signal is determined by buffering the received signal for a number of cycles and analyzing, e.g., the shape of the waveform of the buffered signal. These approaches may require that several edges of a carrier signal be detected before the system can determine whether the received signal contains the carrier signal or noise. As a result, edges of a data signal may not be adequately preserved, which can make it difficult to achieve low pulse width distortion.

Using two comparators for signal detection, as indicated above, some embodiments of the present disclosure quickly detect presence of a carrier signal based on an amplitude of a voltage difference between the differential signal lines. The quick detection helps to improve accuracy of edge data in modulated data symbols. The accuracy of the edge data may be particularly important for some applications. For instance, some applications may encode data values using pulse width. Inaccuracies in edge data may cause incorrect pulse width to be determined.

It is recognized that in some applications, noise in the received modulated signal may create voltage differences between the differential pair of signal lines that cause the two comparators to detect either the first or second states when the carrier signal is not present. In some embodiment, the receiver may include a filtering circuit, such as a low pass filter, to filter out high frequency noise that may have been detected by the comparators as one of the first or second states.

In some embodiments, the receiver circuit includes a detection circuit to determine whether the carrier signal is present based on outputs of the first and second comparators. In some implementations, the detection circuit is implemented using a logical OR gate having inputs connected to outputs of the first and second comparators. In some embodiments, the receiver circuit includes a low-pass filter to filter high frequency noise in a demodulated signal output from the logical OR circuit that may be caused by process variations of transistors used to implement the comparators and/or the logical OR gate.

In some embodiments, the receiver is included in an apparatus having a transmitter operating in a different voltage domain than the receiver. The transmitter is galvanically isolated from the receiver by an isolation circuit that provides a capacitive-coupled signal path between the transmitter and receiver circuits. For instance, the transmitter is configured to modulate a data signal and transmit the modulated data signal, via the capacitive-coupled signal path, to the receiver circuit.

Turning now to the figures, FIG. 1 depicts a block diagram of a system for communicating between a transmitter and a receiver, with operation in different voltage domains, consistent with one or more embodiments of the present disclosure. The system 100 includes a transmitter 102 and a receiver 110, galvanically isolated from one another, and configured to communicate data values over a differential pair of signal lines. Capacitive-coupling of the signal line is provided by isolation circuit 104. For instance, in one embodiment, the isolation circuit 104 connects a first end of each signal line (connected to the transmitter 102) to a first plate of a respective capacitor and connects a second end of each signal line (connected to the receiver 110) to a second plate of the corresponding capacitor. Each capacitor provides galvanic isolation between the first and second ends of the corresponding signal line.

The transmitter 102 is configured to modulate a received data signal and transmit the modulated data signal to the receiver 110. For instance, in one particular embodiment, the transmitter is configured to modulate the data signal using OOK modulation, where a first value of the data signal is represented by the presence of an oscillating carrier signal and a second value of the data signal is represented by the absence of an oscillating carrier signal.

The receiver is configured to demodulate the OOK modulated signal by detecting the presence or absence of a carrier signal to produce a demodulated signal having respective first or second data values, corresponding to the presence or absence of the carrier signal. In one embodiment, the receiver circuit includes a first comparator 112 configured to detect the absence of a first state of the carrier signal and a second comparator 114 configured to detect the absence of a second state of the carrier signal.

The carrier signal of the modulated signal has first and second states. For instance, the carrier signal may have a first state corresponding to a first value of the carrier signal and a second state the corresponding to second value of the carrier signal. A first comparator circuit of the receiver is configured to detect the presence or absence of the first state of the carrier signal. A second comparator circuit of the receiver is configured to detect the presence or absence of the second state of the carrier signal. Based on the detection of the first and second states, the receiver circuit determines whether the carrier signal is present or absent to determine a demodulated value of the modulated signal. The first comparator 112 is configured to detect the first state of the carrier signal by having a non-inverting input connected to a first one of the differential signal lines and an inverting input connected to a second one of the differential signal lines. Conversely, the second comparator 114 is configured to detect the second state of the carrier signal by having a non-inverting input connected to the second one of the differential signal lines and an inverting input connected to the first one of the differential signal lines. For ease of explanation, detection of the carrier signal by the comparator circuits is discussed with reference to exemplary waveforms shown in FIG. 2.

Figure 2:
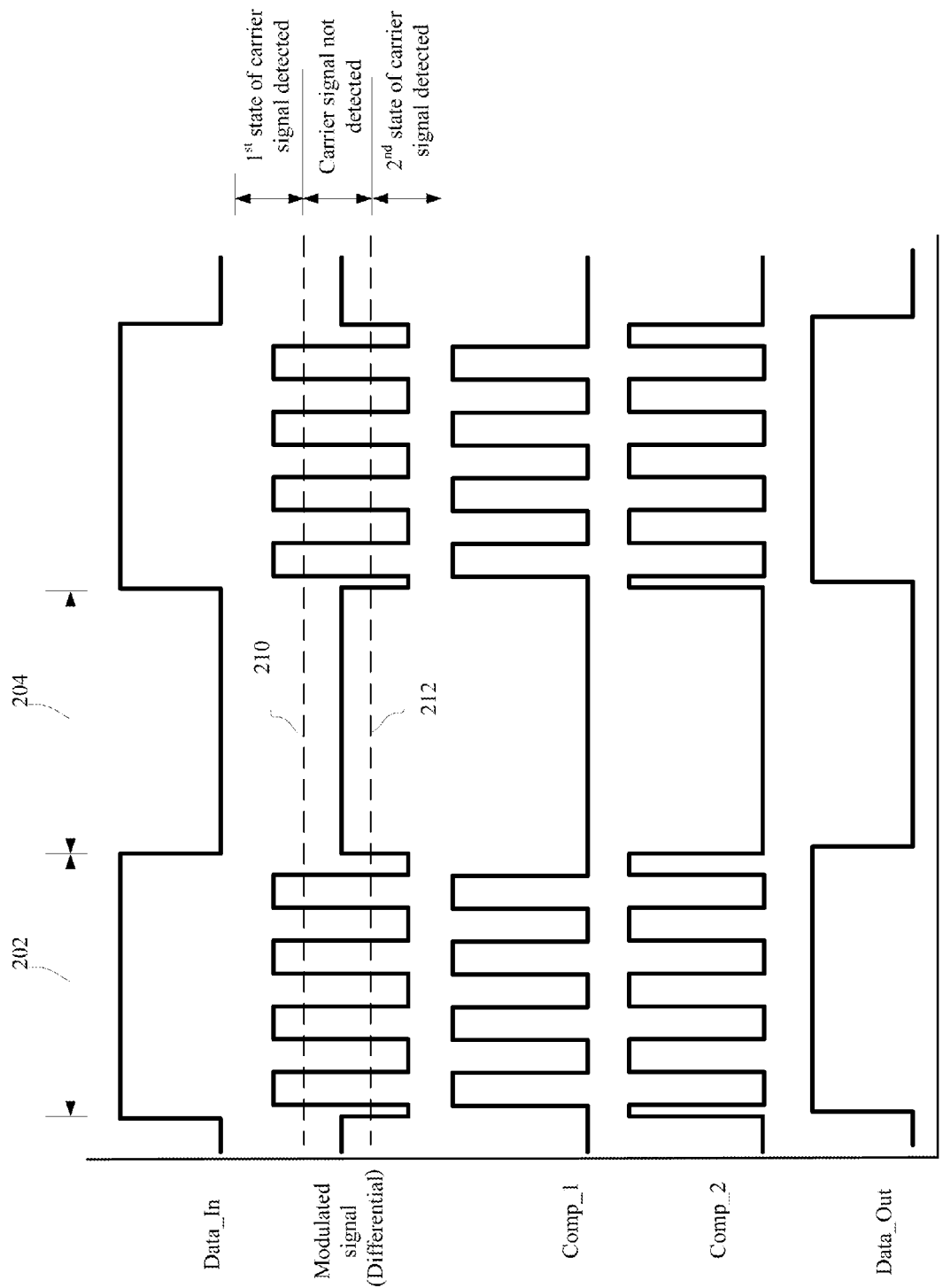
FIG. 2 depicts example waveforms generated for communication between two voltage domains, consistent with one or more embodiments of the present disclosure.

FIG. 2 shows an example set of waveforms for the data signal modulated by the transmitter (data_in), a differential OOK modulated signal transmitted by the transmitter, waveforms generated by the first and second comparator circuits (comp_1 and comp_2) in response to the modulated signal, and a demodulated signal (data_out).

In this example, the first and second comparators (112 and 114) are each configured to generate a first output value when the carrier signal is not present on the differential signal lines. When the carrier signal is present, at least one of the comparators will output a second value when the carrier signal is present. The first and second output values may correspond, for example, to respective low and high voltage levels in a binary signaling system, where the low voltage represents a binary value of '0' and the high voltage represents the binary value of '1'. For ease of explanation, the first output value (e.g., the low voltage) may be referred to as a value of '0' and the second output value (e.g., the high voltage) may be referred to as a value of '1.'

A value of '0' may be differentially represented by providing a negative voltage difference between the differential pair of signal lines that exceeds a minimum threshold 212. A value of '1' may be differentially represented by providing a positive voltage difference between the differential pair of signal lines that exceeds a minimum threshold 210. At voltage differences between the thresholds 210 and 212, the differential value is referred to as an intermediate value (e.g., voltage difference between the differential pair is near 0 volts). Referring to FIG. 1, the voltage difference provided by the modulated signal is considered to be positive when the '+' signal line has a voltage that is greater than the '−' signal line, and is considered to be negative when the '+' signal line has a voltage that is less than the '−' signal line.

In the example shown in FIG. 2, when data_in has a value of '1', the modulated signal generated by the transmitter 102 alternates, according to a carrier signal, between two differential encoded values ('0' and '1') that are transmitted on the differential signal lines to receiver 110. For instance, during time period 202, in response to data_in having a value of '1', the modulated signal is alternating between a positive difference value (i.e., above threshold 210) and a negative difference value (i.e., below threshold 212). When data_in is zero (e.g., during time period 204), a differential signal is not transmitted and the voltage difference between the differential pair of signal lines is approximately zero (assuming noise is not present). The comparators output complementary signals (comp_1 and comp_2), which indicate the presence and absence of the first and second states of the carrier signal. In this example, the first state is detected by comparator 112 when the modulated signal has a positive voltage difference above threshold 210. The second state is detected by comparator 114 when the modulated signal has a negative voltage difference below threshold 212.

In the example shown in FIG. 2 the carrier signal of the modulated signal alternates between '0' and '1' values when data_in has a value of '1'. It is recognized that other carrier signal waveforms or patterns may be used as well so long as either a differential '0' or '1' is transmitted when data_in has a value of '1' and the differential value is intermediate (i.e., between thresholds 210 and 212) when data_in has a value of '0'.

For instance, as shown in FIG. 2, comp_1 has a value of '1' when the modulated signal has a differential value of '1' (i.e., above threshold 210), and has a value of '0' when the modulated signal has a differential '0' or intermediate value (i.e., below threshold 210). Conversely, comp_2 has is a value of '1' when the modulated signal has a differential value of '0' (i.e., below threshold 212) and has a value of '0' when the modulated signal has a differential '1' or intermediate value (i.e., above threshold 212).

Referring back to FIG. 1, the receiver 110 includes a detection circuit 116 configured to detect when the carrier signal is present from the output signals from the first and second comparators (112 and 114). In the example, shown in FIG. 2, when the output of both of the comparators (comp_1 and comp_2) have a value of '0', the detection circuit 116 infers that the modulated signal corresponds to a demodulated signal (data_out) having a value of '0'. Conversely, when either of the signals output from the comparators (comp_1 and comp_2) have a value of '1', the detection circuit 116 infers that the modulated signal corresponds to a demodulated signal (data_out) having a value of '1'.

Alternatively, in some embodiments, presence of the alternating carrier signal in the modulated signal may correspond to a demodulated signal (data_out) having a value of '0' and absence of the alternating carrier signal in the modulated signal may correspond to a the demodulated signal having a value of '1'.

As illustrated in FIG. 2, because the comparator circuits detect both first and second states of the carrier signal, edges of the data signal (data_in) can accurately be detected regardless of the frequency of the carrier signal. As a result, modulation circuitry of the transmitter 110 and demodulation circuitry of the receiver 110 can be implemented using digital circuitry for detection and lower clock speeds than previous approaches, which may reduce power consumption as well as manufacturing costs.

Figure 3:
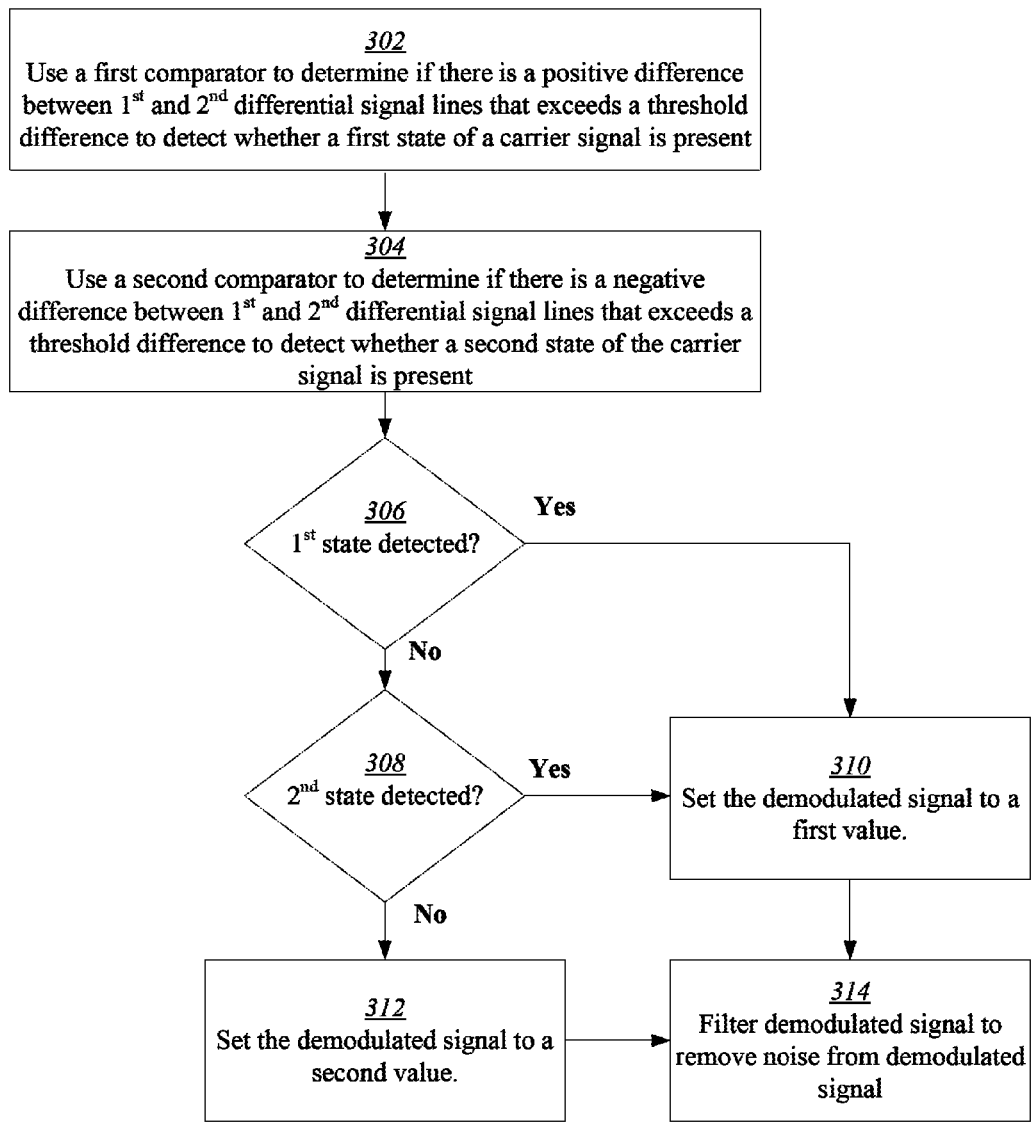
FIG. 3 shows a flowchart of a demodulation process performed by a receiver, in accordance with one or more embodiments.

FIG. 3 shows a flowchart of the demodulation process performed by the comparators and detection circuit, in accordance with one or more embodiments. A first comparator is used, at block 302, to determine if a voltage difference between first and second differential signal lines is positive and exceeds a positive threshold difference (e.g., above threshold 210). If so, a first state of a carrier signal is detected. A second comparator is used, at block 304, to determine if the voltage difference between first and second differential signal lines is negative and exceeds a negative threshold difference (e.g., below threshold 212). If so, a second state of a carrier signal is detected. If either the first or second state is detected at decision blocks 306 and 308, a demodulated signal is set to a first value at block 310. Otherwise, the differential signal lines have an intermediate value and the demodulated signal is set to a second value at block 312. As indicated above, some embodiments may filter the demodulated signal, at block 314, to remove noise from the demodulated signal.

Figure 4:
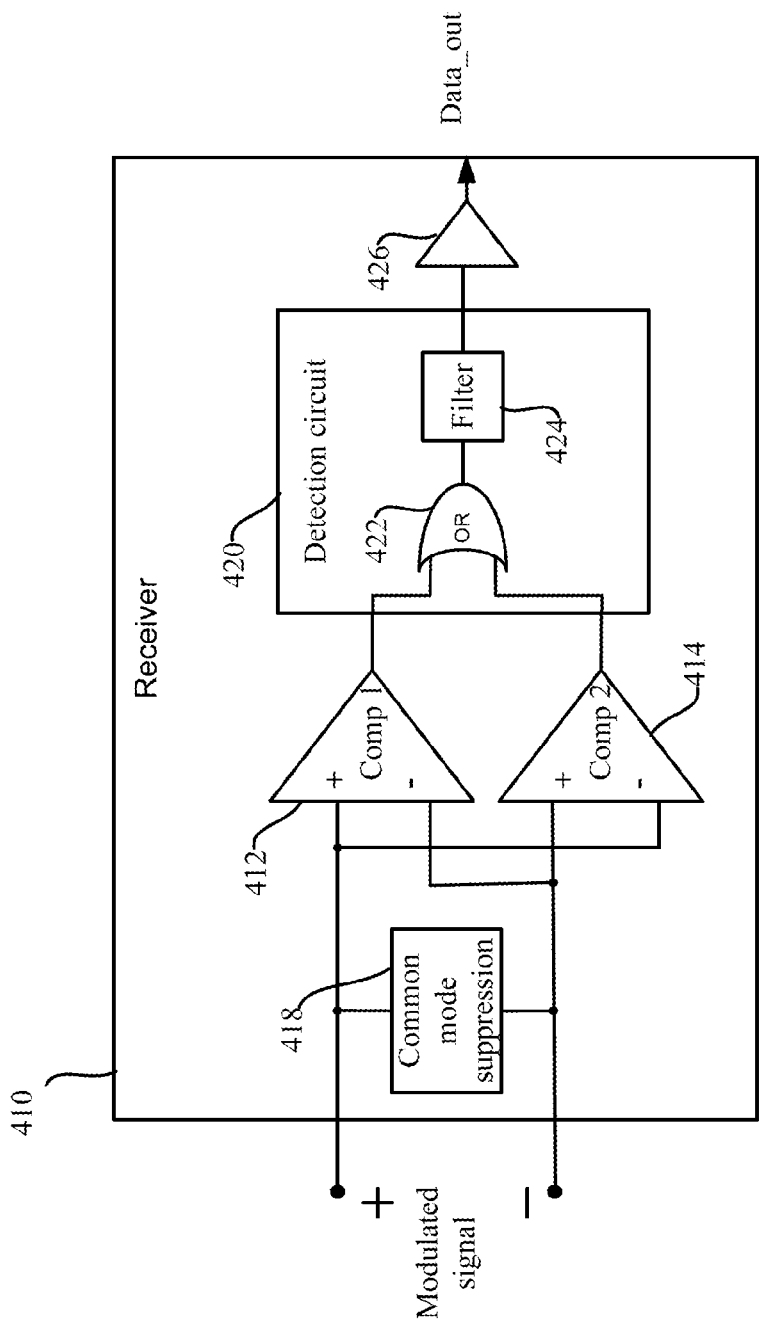
FIG. 4 shows a block diagram of a circuit that may be used to implement a receiver, consistent with one or more embodiments.

FIG. 4 shows a block diagram of a circuit that may be used to implement a receiver, in accordance with one or more embodiments. The receiver 410 includes first and second comparator circuits (412 and 414) respectively configured to detect first and second states of a carrier signal in a modulated signal received on a differential pair of capacitive-coupled signal lines. The receiver includes a detection circuit configured to detect presence or absence of a carrier signal in the received modulated signal based on the outputs of the first and second comparators circuits (412 and 414). The first comparator 412, the second comparator 414, and the detection circuit 420 operate in a manner similar to that described with reference to the first comparator 112, the second comparator 114, and the detection circuit 116 shown in FIG. 1.

In one embodiment, the detection circuit is configured to detect presence and absence of the carrier signal using a logical OR gate 422 having a first input connected to an output of the first comparator 412 and a second input connected to an output of the second comparator 414. This corresponds, for instance, to an implementation where presence of the carrier signal represents a data value of '1' and absence of the carrier signal represents a data value of '0'. As discussed with reference to FIG. 2, when the carrier signal is present in the modulated signal, at least one of the signals (comp_1 and comp_2) generated by the first and second comparators (412 and 414) will have a value of '1'. As a result, the logical OR gate 422 will output a value of '1', which corresponds to the demodulated data value (data_out) having a value of '1'. Conversely, when the carrier signal is not present in the modulated signal, neither of the signals (comp_1 and comp_2) generated by the first and second comparators (412 and 414) will have a value of '1'. As a result, the logical OR gate 422 will output a value of '0', which corresponds to the demodulated data value (data_out) having a value of '0'.

As mentioned above, in some embodiments, presence of the carrier signal in the modulated signal may correspond to a value of '0' and absence of the alternating carrier signal in the modulated signal may correspond to a value of '1'. In such embodiments, the detection circuit 420 may demodulate the signal from the outputs of the comparator circuits (412 and 414) by using a logical NOR gate. For instance, when the carrier signal is present in the modulated signal, at least one of the signals (comp_1 and comp_2) generated by the first and second comparators (412 and 414) will have a value of '1'. As a result, the logical NOR gate will output a value of '0', which corresponds to the demodulated data value (data_out) having a value of '0'. Conversely, when the carrier signal is not present in the modulated signal, neither of the signals (comp_1 and comp_2) generated by the first and second comparators (412 and 414) will have a value of '1'. As a result, the logical NOR gate will output a value of '1', which corresponds to the demodulated data value (data_out) having a value of '1'.

Depending on the implementation and application, high frequency transient noise may be inadvertently introduced, e.g., due to process variation in the transistors used to implement the first and second comparators (412 and 414) and/or the OR/NOR gate of the detection circuit 420. In one or more embodiments, the detection circuit 420 includes a filtering circuit 424 (e.g., low-pass filter, band-pass filter, etc.) to filter out transient signals unrelated to the carrier signal.

As indicated above, because the comparator circuits detect both first and second states of the carrier signal, edges of the data signal (data_in) can accurately be detected even when a lower frequency is used for the carrier signal. Due to the use of a lower frequency for the carrier signal, the low-pass filter can be configured to filter out noise over a larger frequency range without effecting detection of the carrier signal.

It is recognized that the receiver may include additional circuitry for signal processing as well. For instance, in some embodiments, the receiver 410 may include a driver circuit 426, following the detection circuit 420, to boost the demodulated signal (data_out) that is output from the receiver. Likewise, in some embodiments, the receiver 410 includes common mode suppression circuitry 418 that is configured to limit the input common mode voltage to the receiver from exceeding the operating range of the receiver as shown in FIG. 4 and to prevent the receiving node from floating.

Figure 5:
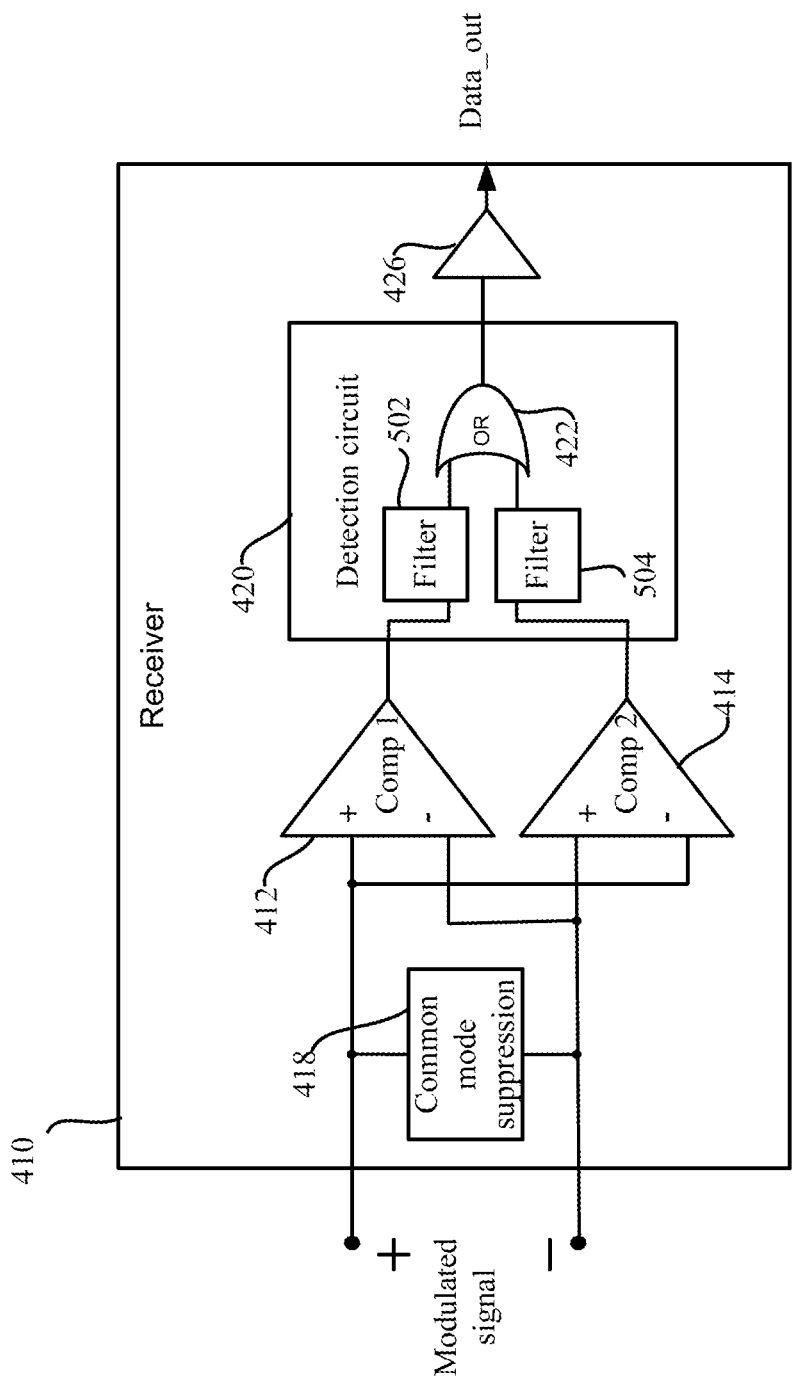
FIG. 5 illustrates a circuit diagram of a receiver in accordance with one or more embodiments.

It is recognized that the filtering discussed with reference to FIG. 4 may be performed at various nodes in the receiver circuit. For instance, FIG. 5 shows a block diagram of a circuit that may be used to implement a receiver, where output of the first and second comparators is filtered to remove noise detected by the comparators. The receiver in FIG. 5 is similar to that shown in FIG. 4. For ease of explanation, reference numbers of FIG. 4 are used to indicate similar aspects. In FIG. 5, filtering circuits 502 and 504 are connected to outputs of respective comparator circuits 412 and 414. The filtering circuits may be, e.g., low-pass filters or band-pass filters configured to filter out one or more frequencies that are higher and/or lower than a frequency of the carrier signal. For instance, the filtering circuits 502 and 504 may be band-pass filters configured to pass frequencies of the carrier signal while blocking other frequencies in which noise may be present. The filtered signals are processed by logical OR circuit 422 as described above.

In certain instances, one or more embodiments can use different coding techniques and different types of circuits communicating data through the isolation region. The data communications can use analog, digital, RF, serial and/or parallel communication techniques. For certain high-speed applications, different types of modulation schemes can be used for carrying information across the isolation region, including but not limited to OOK (on-off keying), amplitude, phase-based and/or frequency-based. In some instances, communications can be carried out between multiple circuits placed within a single chip-package (e.g., BGA package) and also having galvanic isolation therebetween. The various communications can be carried out using different isolation buffer circuits and amplifiers. Various applications are also contemplated including, but not limited to, applications in which small voltage differences exist between transmitters and receivers and applications in which large voltages can exist (e.g., hundreds of volts as can be used in automotive applications where electric motors are used in place of (or in combination with) combustion engines). Consistent with one or more embodiments discussed herein, U.S. Pat. No. 6,920,576 (filed May, 31, 2001; Ehmann, Gregory E.), U.S. Pat. No. 6,882,046 (filed Dec. 18, 2001; Davenport, et al.) and "Signal Isolation Buffer Amplifiers" Burr-Brown, ISO 102, ISO 106, January 1995, each describe useful technical details, applications and various background information, and each of these documents is fully incorporated herein by reference.

The embodiments are thought to be applicable to a variety of applications using galvanic isolation. Other aspects and embodiments will be apparent to those skilled in the art from consideration of the specification. While the present disclosure is amenable to various modifications and alternative forms, specifics thereof have been shown by way of example in the drawings and will be described in further detail. It should be understood that the intention is not to limit the disclosure to the particular embodiments and/or applications described. On the contrary, the intention is to cover all modifications, equivalents, and alternatives falling within the spirit and scope of the present disclosure.

What is claimed is:
1. A device comprising:
a receiver circuit having a first comparator circuit and a second comparator circuit and configured and arranged to receive a modulated signal, the modulated signal including a binary data signal encoded according to a communication protocol, provide common mode suppression for current transients, and demodulate the modulated signal to retrieve the binary data signal by using the first comparator circuit to detect the absence of a first signal state of the modulated signal, using the second comparator circuit to detect the absence of a second signal state of the modulated signal, and determine the absence of a carrier signal in the modulated signal in response to the absence of both the first signal state and the second signal state.

2. The device of claim 1, further including a transmitter circuit configured and arranged to generate the modulated signal in response to receiving the binary data signal, and transmit the modulated signal to the receiver circuit; and wherein:

the receiver circuit is further configured and arranged to receive the modulated signal on a differential pair of signal lines;

the first comparator includes a non-inverting input connected to a first one of the differential pair of signal lines and an inverting input connected to a second one of the differential pair of signal lines; and the first comparator includes a non-inverting input connected to the second one of the differential pair of signal lines and an inverting input connected to the first one of the differential pair of signal lines.

3. The device of claim 2, wherein:

the first comparator is configured to indicate an absence of the first state in response to the first one of the differential pair of signal lines having a negative voltage, greater than a negative threshold voltage, with reference to the second one of the differential pair of signal lines; and the second comparator is configured to indicate an absence of the second state in response to the first one of the differential pair of signal lines having a positive voltage, greater than a positive threshold voltage, with reference to the second one of the differential pair of signal lines.

4. The device of claim 1, wherein the receiver circuit further comprises a detection circuit configured to detect the absence of the carrier signal based on output signals of the first and second comparators.

5. The device of claim 4, wherein the detection circuit includes a logical OR gate having a first input connected to an output of the first comparator circuit and a second input connected to an output of the second comparator circuit.

6. The device of claim 5, wherein the logical OR gate is configured and arranged to:

output a first binary signal, indicating absence of the carrier signal, in response to the first comparator determining the absence of the first signal state and the second comparator determining absence of the second signal state; and output a second binary signal, representing presence of the carrier signal, in response to either the first comparator determining presence of the first signal state, or the second comparator determining presence of the second signal state.

7. The device of claim 4, further comprising a filtering circuit connected to an output of the detection circuit.

8. The device of claim 7, further comprising a driver circuit connected to an output of the filtering circuit.

9. The device of claim 1, wherein the modulated signal is an on-off key (OOK) modulated signal.

10. The device of claim 1, further comprising, an isolation circuit, configured and arranged to receive the modulated signal and forward the modulated signal to the receiver circuit.

11. The device of claim 1, further comprising:

a transmitter circuit configured and arranged to modulate a received data signal to produce a version of the modulated signal having the carrier signal present in response to a first value of the data signal and having the carrier signal absent in response to a second, different value of the data signal, and transmit the version of the modulated signal.

12. The device of claim 11, further comprising an isolation circuit configured and arranged to receive the transmitted version of the modulated signal from the transmitter circuit and to provide the modulated signal that has capacitive isolation from the transmitter circuit.

13. The device of claim 12, wherein the transmitter circuit is further configured and arranged to transmit the version of the modulated signal on a differential pair of signals having two signal components and wherein the isolation circuit includes two capacitive isolation paths for a respective and corresponding signal component of the two signal components.

14. The device of claim 11, wherein the transmitter circuit is further configured and arranged to modulate the data signal with a carrier signal by alternating between two signal states relative to a pair of conductive signal paths, the two signal states including the first signal state and the second signal state.

15. A method, for communication, comprising:

receiving a modulated signal from a differential pair of capacitive-coupled signal lines;

using a first comparator, determining whether a first state of the modulated signal is present;

using a second comparator, determining whether a second state of the modulated signal is present;

in response to either an output of the first comparator or an output of the second comparator indicating that the first or second states of the modulated signal is present, setting a demodulated signal to a first value; and in response to the output of the first comparator and output of the second comparator indicating that neither of the first or second states of the modulated signal is present, setting the demodulated signal to a second value.

16. The method of claim 15, wherein the setting of the demodulated signal value to either the first or second values includes generating the demodulated signal using a logical OR gate.

17. The method of claim 15, wherein:

the determining whether a first state of the modulated signal is present includes determining whether a first one of the differential pair of signal lines has a negative voltage, greater than negative threshold voltage, with reference to a second one of the differential pair of signal lines; and the determining whether a first state of the modulated signal is present includes determining whether the first one of the differential pair of signal lines has a positive voltage, greater than a positive threshold voltage, with reference to the second one of the differential pair of signal lines.

18. The method of claim 15, further comprising:

generating the modulated signal from a data signal using a transmitter; and transmitting the modulated signal on the differential pair of capacitive-coupled signal lines.

19. The method of claim 18, wherein the generating and transmitting of the modulated signal includes:

in response to the data signal having a first value, transmitting a differential signal that alternates between a first binary differential value and a second binary differential value on the differential pair of signal lines; and in response to the data signal having a second value, setting the differential pair of signal lines to a same voltage level.

20. An apparatus comprising:

a transmitter circuit configured and arranged to encode a binary data value according to a first communication protocol to produce a modulated signal; and a receiver circuit configured and arranged to receive the modulated signal from the transmitter and demodulate the modulated signal to retrieve the binary data signal, the receiver circuit including:

a first comparator circuit configured and arranged to detect the absence of a first signal state of the modulated signal, a second comparator circuit configured and arranged to detect the absence of a second signal state of the modulated signal, and a detection circuit configured and arranged to demodulate the modulated signal, based on an output of the first comparator and an output of the second comparator, and to output the binary data signal.

21. The apparatus of claim 20, wherein the detection circuit includes:

a first filter having an input coupled to the output of the first comparator circuit;

a second filter having an input coupled to the output of the second comparator circuit; and a logic circuit having a first input coupled to an output of the first filter and a second input coupled to an output of the second filter, the logic circuit configured and arranged to determine the absence of a carrier signal in the modulated signal in response to the absence of both the first signal state and the second signal state, and wherein the first and second filters being configured and arranged to pass frequencies of a carrier signal to the inputs of the logic circuit while blocking other frequencies associated with noise.

* * * * *